(No Model.) 2 Sheets—Sheet 1.
J. F. BARKER.
APPARATUS FOR CARBURETING AIR.
No. 560,388. Patented May 19, 1896.
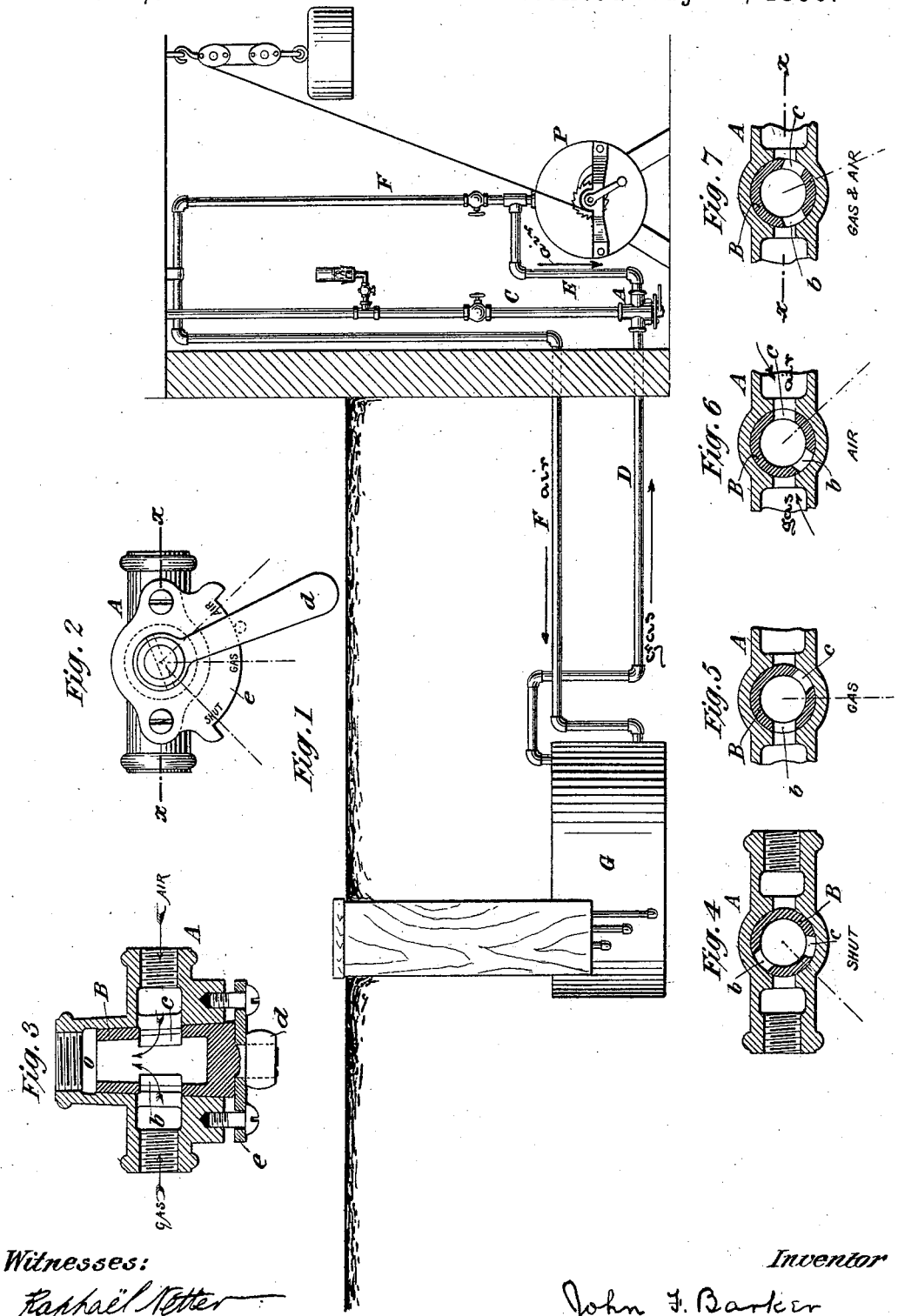
Witnesses:
Raphaël Netter
Sands F. Randall
Inventor
John F. Barker
by Clarkson A. Collins
Attorney.

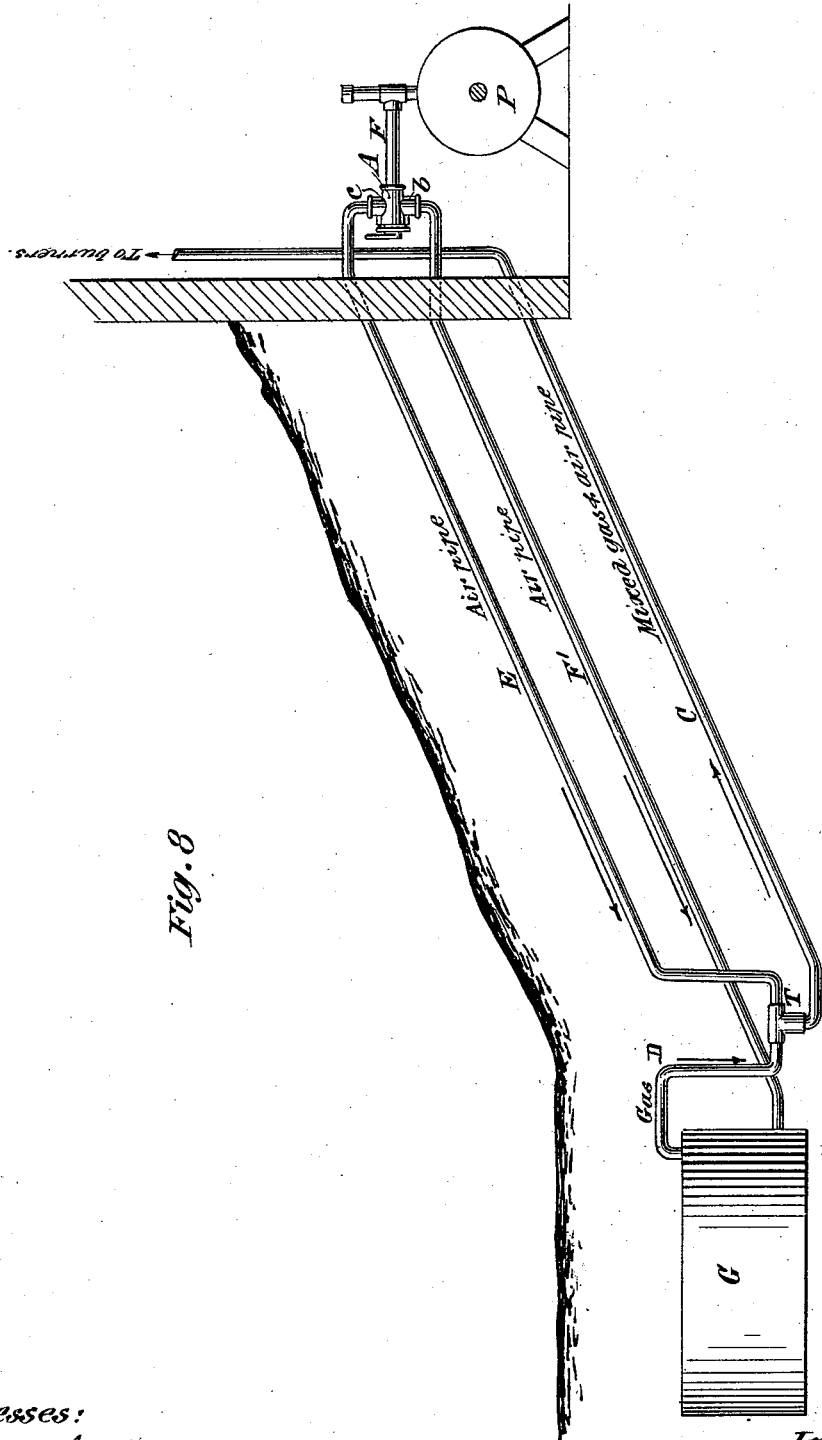

UNITED STATES PATENT OFFICE.

JOHN F. BARKER, OF SPRINGFIELD, MASSACHUSETTS.

APPARATUS FOR CARBURETING AIR.

SPECIFICATION forming part of Letters Patent No. 560,388, dated May 19, 1896.

Application filed June 19, 1895. Serial No. 553,272. (No model.)

*To all whom it may concern:*

Be it known that I, JOHN F. BARKER, a citizen of the United States, residing in Springfield, in the county of Hampden and State of Massachusetts, have invented certain new and useful Improvements in Apparatus for Carbureting Air, of which the following is a specification.

My invention relates to that class of apparatus used in generating illuminating-gas by charging atmospheric air with the vapor of a volatile hydrocarbon liquid, such as gasolene, and the main parts of which are a vessel, called a "generator" or "carbureter," containing the volatile hydrocarbon liquid, and an air-pump or air-forcing apparatus, by which air is forced to and through the carbureter and through to the burners. In producing such gas a difficulty is experienced owing to the nature of the volatile hydrocarbon liquids employed, which are not homogeneous in the sense that all parts are equally volatile, but may be said to be made up of a number of grades of different degrees of volatility. Hence when atmospheric air is passed over such a liquid the more volatile portions are first and most rapidly evaporated, and the air is heavily charged with hydrocarbon vapor, while as the liquid becomes more dense, through the volatilization of its more volatile parts, the amount of vapor received by a given quantity of air passing over it will continually grow less, thus giving rise to great variations in the gas-flame. One method of compensating for this variation, so as to produce a gas-flame of uniform quality, is by mixing with the gas after it leaves the generator or carbureter atmospheric air in proportions varied to correspond with the variations in the quality of the gas, the proportion of air mixed with the gas being relatively large when the gas is overrich in hydrocarbon vapor and being reduced as the gas grows poorer in quality. The air mixed with the gas is supplied by the same air-pump or air-forcing device by which air is driven to and through the carbureter. To form a suitable mixture by connecting a pipe from the air-pump to the main gas-pipe or a chamber connected therewith and varying the orifice of the air-pipe by means of a suitable cock would at first sight appear a simple matter. A difficulty is, however, experienced owing to the facts, first, that the capacity of the pipes leading to the burners must at all times be equal to the quantity of gas required by the maximum number of burners supplied by the apparatus, and, second, that the weight of the gas or mixture of air and hydrocarbon vapor coming from the carbureter, and consequently the velocity with which it travels, continually varies with variations in the amount of hydrocarbon vapor carried by the air. As a result a relatively smaller quantity of gas is brought from the carbureter to the point at which atmospheric air is mixed with the gas when the gas is rich or heavily charged with hydrocarbon vapor than when the gasolene in the carbureter has become less volatile, so that a smaller proportion of vapor is absorbed by the air passing through it, and the mixture is consequently not so heavy. At the same time a relatively greater quantity of air is brought to and mixed with the gas at this point, since the passage of air through the carbureter is more obstructed by the greater weight of the gas therein and the air from the air-pump tends to seek the path of least resistance. In order to obviate the difficulties arising from these causes, various more or less complicated devices have been employed, to the end of modifying or regulating the quality of the gas after it leaves the carbureter, so as to provide a flame of a constant quality.

The object of my improvements is to provide a means for accomplishing this object much simpler and more economical in construction than has heretofore been considered possible. To this end I connect the gas-pipe leading from the carbureter with a supplementary air-pipe from the usual air-forcing apparatus and control the relative quantities of air and gas coming to the mixing-point by means of a three-way cock, one port of which determines the proportion of undiluted gas and another the proportions of air to be mingled therewith to make up the mixture passing to the burners. These two ports are adapted to be opened and closed by turning the core or plug of the cock, and are so arranged that when one of the ports is opened the other is at the same time closed to precisely the same extent, and vice versa, and also so that the combined capacity of the ports at any time will be equal to the passage of the quantity of gas required for the maximum number of burners supplied by the apparatus. With this arrangement variations in the quality of the gas, due to changes in the number of burners in operation, will not be experienced, but the cock being set with reference to the quality of the gas coming from the carbureter, each port will at all times supply its proper proportion of the mixture to be made. The third port of the cock is permanently open, and its capacity is equal to the combined capacities of the other two ports. I have found also that if the mixing-cock, or the point at which the air and gas meet, be fixed at such a level with reference to the carbureter that the pressure of the gas in the pipe between such point and the carbureter is substantially equal to the gas-pressure within the carbureter, or, in other words, so that the two columns of gas counterbalance each other, variations in the quality of the mixed air and gas which would otherwise occur, due to variations in the weight of the gas, are avoided. This point will as a rule be at about the level of the entrance of the air-pipe into the carbureter, but may be determined in any given case by experiment or calculated in a manner that will be well understood by those skilled in the art.

The invention will be best understood by reference to the accompanying drawings, in which—

Figure 1 shows a general view of an air-pump and carbureter with the connecting-pipes and the mixing-cock in position, and Fig. 2 shows an elevation of the mixing-cock. Fig. 3 shows a section of the mixing-cock lengthwise through the core or plug; and Figs. 4 to 7 are sections of the cock on the line $xx$ in Fig. 2, showing the ports in different positions, the dotted line indicating the handle of the cock. Fig. 8 shows a modification of the manner of connecting the cock.

The same letters of reference indicate corresponding parts throughout the drawings.

Referring to the drawings, P indicates the ordinary air-forcing apparatus or air-pump employed in such devices, and G the carbureter or generating-chamber which contains commercial gasolene or other volatile hydrocarbon liquid and within which air, forced through it by the air-pump, is impregnated with hydrocarbon vapor to form the illuminating-gas.

F is the air-pipe from the air-pump to the carbureter, and D the gas-pipe leading from the carbureter.

E is a supplementary air-pipe from the air-pump.

A is a three-way cock having a hollow core B, into which open side ports $b$ and $c$ and to which is attached a handle $d$, by means of which the core B is revolved so as to open and close the ports $b$ and $c$.

The gas-pipe D and the air-pipe E are connected, respectively, with the ports $b$ and $c$ and discharge their contents through them into the hollow core B, whence the mixed air and gas pass, preferably, first into a mixing chamber, (not shown in the drawings,) so that they may become thoroughly commingled, and thence into the pipe C, leading to the burners. The ports $b$ and $c$ are so arranged that when the core B is revolved to close one of its ports, as $b$, the port $c$ is opened to the same extent that the port $b$ is closed, and vice versa, so that when one port is entirely closed the other is open to its fullest extent. The ports $b$ and $c$ are of such size that whether one port is entirely open and the other closed, or both ports are partly open, the total orifice is equal to the supply of the maximum number of burners to be operated. Ordinarily the ports are made of equal size. Since, however, the air-port is never required to be entirely open while the gas-port is closed, it is evident that the air-port may be made somewhat smaller than the gas-port. By means of this arrangement the valve may be easily set to dilute the gas with air to a proper extent in proportion to the richness of the gas, and each port will furnish its proper proportion of the mixture, whatever the number of burners in operation.

Preferably the handle $d$ moves in front of a dial or plate $e$, suitably marked so as to indicate in which direction the handle should be moved to open or close either port.

In order to provide against variations in the weight of the gas and consequent changes in the speed with which the gas travels in the pipes, I locate the mixing-cock A at such a height with reference to the carbureter that the pressure of the gas in the pipe D between the cock A and the carbureter G shall be substantially equal to and counterbalance the pressure of the gas in the carbureter. The proper location of the cock A may be determined in any given case by experiment, but will be about on the level of the point of entry of the air-pipe F into the carbureter. Thus if the air-pipe F enters the carbureter at the bottom the gas-pipe D will be connected at or near the top of the carbureter and will then be brought down to the level of the point of entry of the pipe F into the carbureter before being connected to the cock A; and in the same manner if the air-pipe F enters the carbureter at the top the pipe D will be connected with the carbureter at the bottom and will be brought up to the level of the point of entry of the pipe F into the carbureter before being connected with the cock A. I have found by experiment that slight changes in the elevation of the cock F, other conditions remaining the same, will produce material variations in the quality of the gas-flame. The friction of the gas passing through the pipe may be disregarded as an element in determining the quality of the gas-flame, and the mixing-cock A may, and usually will be, located at some distance from its carbureter, as in the cellar of the building lighted.

In order that the invention may be conveniently used in those cases where the generator is on a level materially different from that of the cellar of the building lighted, as where it is located on a hillside, so that it is difficult to locate the cock A at the required level, I may employ the construction shown in Fig. 8 of the drawings. In this case the supplementary air-pipe E and the gas-pipe D from the generator are connected to a T T, from which extends the pipe C to the burners.

The main air-pipe F from the air-pump P is connected to the open port in the end of the core B of the three-way cock A, while to the two side ports $b$ and $c$ are respectively connected the pipe F′, conveying air to the generator and the supplementary air-pipe E, which leads to the T T, where its contents are mixed with the gas coming from the generator through the pipe D. The T T, in which the gas-pipe D and supplementary air-pipe E meet, is located on a level with the point of entry of the air-pipe F′ into the generator, either at the generator or in a pit sunk for the purpose in the cellar of the building, and the three-way cock A is placed in any position in the cellar of the building convenient for use.

The function of the three-way cock A in determining the relative proportions of the air and gas which make up the mixture flowing to the burners is evidently the same as when it is connected in the manner shown in Fig. 1, since for this purpose it is immaterial whether the flow of gas is controlled before or after it enters the generator G.

By the means described I am able to so regulate the quality of the gas as to produce at all times a flame of substantially uniform quality, thus accomplishing with a simple and inexpensive device a result that has heretofore required complex and expensive forms of apparatus.

What I claim as new, and desire to secure by Letters Patent, is—

1. In an apparatus for carbureting air the combination with a pipe from the air-pump and a gas-pipe leading from the carbureter of a three-way cock, having two of its ports connected respectively with said pipes and placed on such a level that the column of gas between the cock and the carbureter shall substantially counterbalance the column of gas within the carbureter, substantially as and for the purposes set forth.

2. In an apparatus for carbureting air, the combination of a cock having a hollow core and two side ports opening into such core, a pipe leading to burners connected with such hollow core, and a pipe from an air-pump and a pipe from a carbureter connected respectively with such side ports, said cock being placed at such a level that the gas-pressure due to gravity in the pipe between the cock and the carbureter is substantially equal to the gas-pressure due to gravity within the carbureter, substantially as and for the purposes set forth.

3. In an apparatus for carbureting air the combination of an air-pipe leading from an air-forcing apparatus to a carbureter, a gas-pipe leading from the carbureter, a supplemental air-pipe leading from the air-forcing apparatus, a connection between the supplementary air-pipe and the gas-pipe, at such a level that the pressure of gas due to gravity in the gas-pipe between such point of connection and the carbureter is substantially equal to the gas-pressure due to gravity within the carbureter and a three-way cock, operating to control the relative quantities of air and gas flowing through the supplementary air-pipe and the gas-pipe, substantially as and for the purposes set forth.

In testimony whereof I have hereunto subscribed my name this 26th day of March, A. D. 1895.

JOHN F. BARKER.

Witnesses:
HERBERT N. CROSS,
LOUIS E. MALLORY.